Aug. 20, 1929.   J. E. WIHLFAHRT   1,725,036
PROCESS OF MIXING DOUGH
Filed Oct. 29, 1925
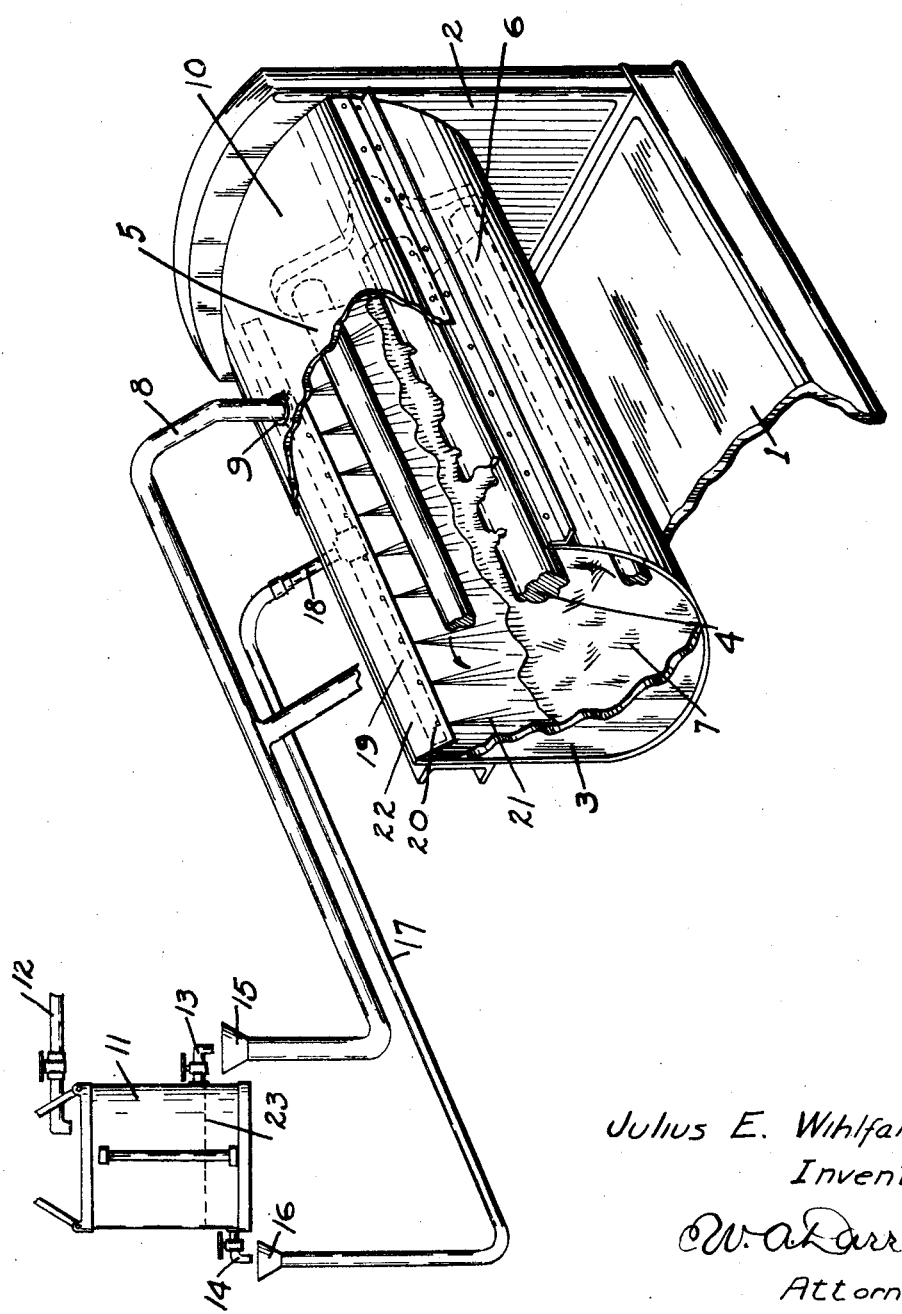
Julius E. Wihlfahrt
Inventor
W. A. Darrah
Attorney Patented Aug. 20, 1929.

1,725,036

UNITED STATES PATENT OFFICE.

JULIUS E. WIHLFAHRT, OF NEW YORK, N. Y.

PROCESS OF MIXING DOUGH.

Application filed October 29, 1925. Serial No. 65,699.

My invention relates to dough mixers such as are ordinarily used in commercial bakeries.

It is the object of my invention to provide a process and equipment which permits the manufacture of an improved quality of bread, while using a smaller amount of power to operate the mixer and with a smaller amount of resultant heating.

My invention also permits a more thorough incorporation of the ingredients of the dough, by reason of affording a longer mixing period. My invention also results in greater uniformity and greater ease of control of the mixing process, as well as a better product. Other objects of my invention will appear from the specification, drawings and claim, submitted hereto.

Referring to the drawing, the figure shows a diagrammatic view of my invention, the equipment being indicated as partially broken away and partially in section. In the drawing, 1 indicates a base or support for a dough mixer on which are placed upright frames 2, which serve to support shell 3, in which the ingredients are mixed to form a dough.

A central shaft 4, is mounted to rotate within shell 3, and carry auxiliary mixing arms 5 and 6.

The dough is indicated by reference #7.

Water is fed into the shell 3, through pipe connection 8, which enters by hole 9, in the top of the mixer 10.

The type of mixer which I have shown and here describe is not essential to my invention as many kinds of dough mixers may be equipped with apparatus for carrying out my invention. I have merely chosen for purposes of illustration a typical form of dough mixer which I have found to be satisfactory.

Tank 11, represents diagrammatically the scale tank or measuring device, whereby, the water used in the dough is measured.

Scale tank 11, may be hung from a standard weighing device or balanced, or measurments by means of a sight feed may be employed. In the drawing, 12 represents the source of supply from which the water is fed in the scale tank 11.

Scale tank 11, is provided with two cocks 13 and 14, one of which feeds into funnel 15, at the end of pipe 8, while the other discharges into funnel 16, at the end of pipe 17. Pipe 17 is connected by means of a flexible joint 18, to distributing pipe 19, located along the top edge of the shell of the dough mixer. Distributing pipe 19, is provided with a series of holes 20, located preferably on its under side, and so arranged that the water in flowing out of pipe 19, would be directed against the side of dough mixer shell 3, serving to both cool and lubricate the shell.

Sprays 21, indicate diagrammatically a flow of liquid from holes 20, in pipe 19. Obviously this liquid may if desired be oil, lard, or emulsions, but for commercial purposes I have found water to be very satisfactory. A plate or shield 22, is shown covering and protecting distributing pipe 19. Plate 22, may be of any desired form, its prime object being to prevent pipe 19, from becoming clogged with dough or other ingredients or broken or displaced by the mechanical force of the dough during the mixing period.

A dotted line 23, is shown in tank 11. This line indicates diagrammatically the level of water or other liquid which would run out of tank 11, by opening valve 13. The water below the dotted line 23, would only be drawn out of tank 11, by opening valve 14.

In the operation of my process and equipment I proportion the amount of water above the dotted line in tank 11, to the amount of water below the dotted line in tank 11, such that the smaller quantity would be about 10% of the total. I do not wish to be confined to this quantity as different doughs will require varying amounts of water and different grades of flour, or other ingredients will also change the ratio.

In operating my device, I first add the amount of water above dotted line 23, in tank 11, by opening cock 13, allowing this water to flow into shell 3.

The other desired ingredients may be added now or prior to the addition of the water mentioned above.

The dough mixer is then set in rotation and the mixing of the ingredients is begun. As the mixing proceeds, the dough becomes stiffer and thicker, causing a greater resistance to the rotation of the mixing device, and obviously producing a greater amount of heat.

In most commercial mixers the prime source of friction is found to reside between the mass of dough and the walls of the shell 3. By the term, walls, I intend to include the sides, end, bottom, etc. of shell 3.

I have found that by introducing a film of water close to the side of shell 3, as for example, as shown in the figure by jets 21, friction is materially reduced, heating of the dough is much less rapid, longer mixing periods are practical, and a much improved dough results. Incidentally, the degree of hydration of the dough is increased owing to the more uniform distribution of water.

Further, since it is a custom to employ cold water in the mixing of doughs it will be apparent that the jets of cold water entering from distributing pipe 19, serve also to cool the shell.

It will be apparent that the water used to lubricate and cool the sides of shell 3, may be sprayed in under air presure if desirable or may be allowed to flow in by gravity; also as previously mentioned other materials may be added with the water through distributing pipe 19, or in place of the water.

If desired also the lubricating and cooling medium may be added continuously over the entire period of the mix or may be added principally in any desired portion of the mix.

This factor may, of course, be controlled by the manipulation of cock 14.

It will be apparent that many modifications of this process may be made, without departing from the spirit of this invention. Other types of dough mixers than that shown in the figure, may be employed and the process may, of course, be applied to many other materials than the instance shown for illustration; namely, the manufacture of dough for bakery purposes. I do not wish to be restricted to the exact structure shown or the exact steps described herein.

Having now fully described my invention what I now claim as new and wish to secure by Leters of Patent in the United States is as follows:

The process of mixing dough which is composed partly of solid ingredients and partly of water which consists in placing the solid ingredients and a substantial portion of the water into a mixing device, agitating said ingredients and water, and while agitating them introducing the remaining portion of the water in the form of a film between the mass being mixed and a wall of the mixing device to lubricate and cool the wall of the mixing device.

JULIUS E. WIHLFAHRT.